United States Patent [19]

Schafer

[11] 4,325,669
[45] Apr. 20, 1982

[54] PALLET LOADING AND UNLOADING METHOD

[76] Inventor: George Schafer, 845 White Rd., Watsonville, Calif. 95076

[21] Appl. No.: 175,311

[22] Filed: Aug. 4, 1980

[51] Int. Cl.³ .............................................. B66F 9/00
[52] U.S. Cl. .................................. 414/786; 414/608; 414/785
[58] Field of Search .............. 414/425, 607, 608, 785, 414/786, 43

[56] References Cited

U.S. PATENT DOCUMENTS

| | | | |
|---|---|---|---|
| 2,675,139 | 4/1954 | Mercier et al. | 414/607 |
| 2,713,950 | 7/1955 | Roth | 414/43 X |
| 3,180,513 | 4/1965 | Vander Wal | 414/607 |
| 3,495,730 | 2/1970 | Rigsby | 414/785 X |
| 4,065,014 | 12/1977 | Sagmiller | 414/608 |

*Primary Examiner*—James L. Rowland
*Attorney, Agent, or Firm*—Robert G. Slick

[57] ABSTRACT

A pallet loading and unloading system is provided wherein the pallet has a low friction surface and a sheet of thin, tough plastic is placed over such surface and the load is placed on the plastic. The pallet is unloaded by placing it on the ground, raising one end and moving off with the pallet whereby the load slides and remains on said plastic sheet, permitting retrieval and reuse of the pallet.

3 Claims, 4 Drawing Figures

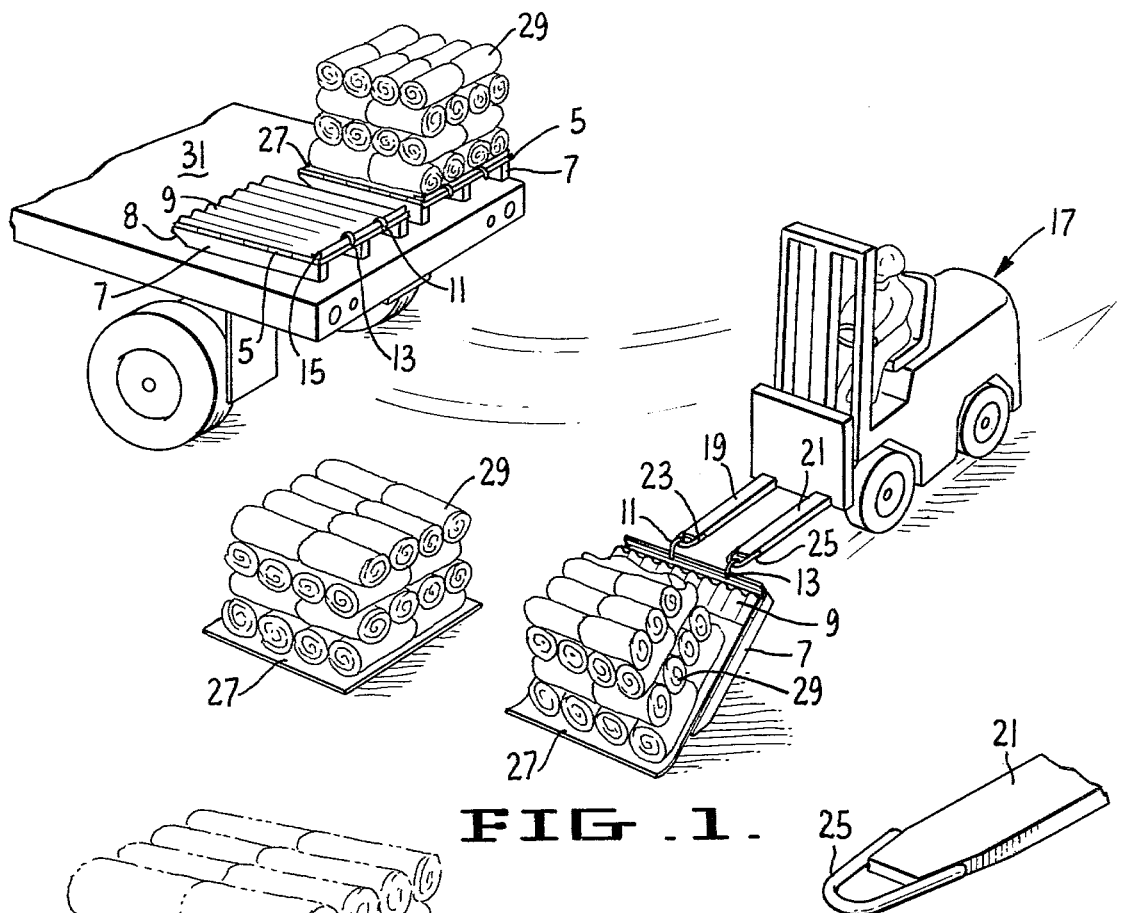
FIG. 1.
FIG. 4.
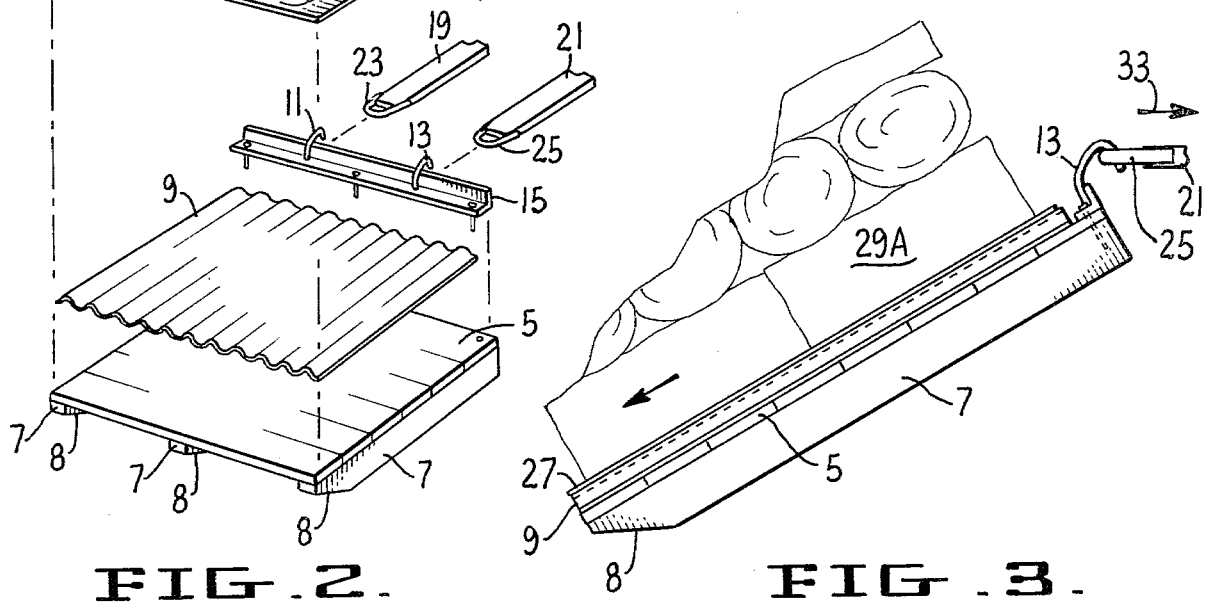
FIG. 2.
FIG. 3.

PALLET LOADING AND UNLOADING METHOD

SUMMARY OF THE INVENTION

The use of pallets is very common in many operations but one difficulty with the use of pallets is that the pallets are expensive.

In most systems which have heretofore been used, goods are delivered on a pallet and are retained on the pallet until the customer uses them.

After the pallet is unloaded it is ordinarily not economically feasible to merely discard the pallet so that it is necessary to provide some means of getting the pallet back to the original owner. This involves a substantial amount of delay and, in many operations, a great amount of confusion since the pallets of one owner may be comingled with the pallets of another. As a practical matter, many pallets become lost for one reason or another.

The present method of loading and unloading pallets provides a system wherein the truck delivering the loaded pallets unloads the pallets at the customers site and returns the pallets for reuse.

Thus, in accordance with the present invention a system is provided wherein there is no delay or confusion in the return of the pallet and the only thing lost in the operation is a very inexpensive sheet of plastic.

The present invention was developed primarily as a method of delivering rolls of sod to a customer and will be so described. Sod is loaded on pallets in the field. The loading is rather loose and no strapping or other means is employed to hold the load together. Thus, pallets loaded with sod will not stand much tilting without spilling. However, the invention is one of broad applicability and can be used in many pallet loading or unloading situations.

BRIEF DESCRIPTION OF THE DRAWINGS

FIG. 1 is a perspective view of a pallet unloading operation in accordance with the present invention.

FIG. 2 is an enlarged, exploded view of a pallet, load and modified fork lift truck utilized in carrying out the method of the present invention.

FIG. 3 is a side view of a pallet being unloaded in accordance with the present invention.

FIG. 4 is an enlarged perspective view of a modified fork tip.

DESCRIPTION OF THE PREFERRED EMBODIMENTS

The basic pallet of the present invention is of the usual structure having what would normally be a bearing surface 5 and a plurality of skids 7. As is well known, the skids are placed so that a fork lift truck can be driven with the forks between the skids and the pallet lifted and moved from place to place. In accordance with the method of the present invention, the basic pallet is provided with a low friction bearing surface 9. Preferably this is in the form of corrugated fiberglass as is frequently used for roofing and partitions. The bearing surface 9 is attached to the top of the pallet 5 in any well known manner as by the use of nails or screws, not shown. It is obvious that the corrugated material will have a low friction in the direction of the ridges. The ends of the skids are chamfered as at 8.

At one end of the pallet, a pair of hooks 11 and 13 are provided and these can be attached to the pallet directly or, preferably, can be attached to a cross member 15. Obviously the hooks 11 and 13 are placed at an end of the pallet which is perpendicular to the ridges of the covering 9.

A conventional fork lift truck 17 is employed which has the usual forks 19 and 21 thereon and these forks are modified by fastening, as by welding, small U-shaped loops 23 and 25 at the tips. It is obvious that the spacing between the forks 19 and 21 must correspond with the spacing of the hooks 11 and 13. Also, it will be noted that the width of the U-shaped loops 23 and 25 are no greater that the width of the forks 19 and 21 so that they will not act in a manner to prevent normal use of the forks.

In loading a pallet, a sheet of a thin, tough plastic 27 is placed over the surface 9 and the load 29 is placed on top of this sheet.

The loaded pallet can now be placed in the usual manner upon a truck 31, a loaded pallet being shown at the off side of truck 31 in FIG. 1. When it is desired to deliver a load to a customer, the pallet is first lifted off the truck using the fork lift in the usual manner. Then, as is shown at the right hand side of FIG. 1 and in more detail in FIG. 3 one engages the hooks 11 and 13 in the loops 23 and 25 and lifts one end of the pallet up to an angle of about 30°. Now one can drive off in the direction shown by the arrow 33 in FIG. 3 and the load 29 including the plastic sheet 27 will slide off, freeing the pallet for return. An empty pallet is shown on the on side of the truck bed 31.

Thus, in accordance with the present invention there is no possibility of losing a pallet and no delay in the return of the pallet. The only expendable item is the thin sheet of plastic which is much less expensive than a pallet.

By using the thin plastic sheet 27, a smaller angle of tilt is required to unload the pallet, thereby reducing the chance of toppling an unstable load such as stacked sod.

The plastic sheet 27 also protects the surface of the corrugated plastic 9 against abrasion from the load. The working surface is kept clean and maintains its low coefficient of friction under repetitive use.

The modified fork tips 23 and 25 in conjunction with the pallet hooks 11 and 13 enable the operator to easily and visibly engage and control the pallet during the load depositing process.

Many variations can be made in the exact system shown without departing from the spirit of this invention. For instance, the surface 9 is described as being made of corrugated fiberglass since this is relatively inexpensive and readily available. However, any low friction surface can be applied to the top of the pallet.

The subject matter claimed is:

1. The method of loading and unloading a pallet comprising:
   a. providing a pallet having a low friction bearing surface,
   b. said pallet having fastening means at one end thereof,
   c. placing a thin tough plastic sheet on the bearing surface of said pallet,
   d. placing a load on said plastic sheet,
   e. engaging said fastening means and raising one end of said pallet,
   f. moving said pallet in the direction of said fastening means whereby, g. said load and said plastic sheet slide off said pallet, assisted by gravity allowing said pallet to be retrieved to reuse.

2. The method of claim 1 wherein the low friction bearing surface of "a" is of a ridged corrugated strong plastic and the fastening means of "b" comprises a pair of spaced hooks at an end which is perpendicular to the ridges of the plastic.

3. The method of claim 2 wherein a fork lift truck with U-shaped loops at the tips of the forks is employed to engage said spaced hooks.

* * * * *